(12) United States Patent
Francos et al.

(10) Patent No.: US 10,699,157 B2
(45) Date of Patent: Jun. 30, 2020

(54) IMAGE COMPARISON SYSTEM AND METHOD

(71) Applicant: Sightec (Israel) Ltd., Lehavim (IL)

(72) Inventors: Joseph Francos, Lehavim (IL); Rami Hagege, Beer Sheva (IL)

(73) Assignee: Sightec (Israel) Ltd., Lehavim (IL)

( * ) Notice: Subject to any disclaimer, the term of this patent is extended or adjusted under 35 U.S.C. 154(b) by 97 days.

(21) Appl. No.: 16/080,007

(22) PCT Filed: Mar. 15, 2017

(86) PCT No.: PCT/IL2017/050332
§ 371 (c)(1),
(2) Date: Aug. 26, 2018

(87) PCT Pub. No.: WO2017/158606
PCT Pub. Date: Sep. 21, 2017

(65) Prior Publication Data
US 2019/0057281 A1 Feb. 21, 2019

Related U.S. Application Data

(60) Provisional application No. 62/308,751, filed on Mar. 15, 2016.

(51) Int. Cl.
*G06K 9/62* (2006.01)
*G06T 7/246* (2017.01)

(52) U.S. Cl.
CPC .......... *G06K 9/6211* (2013.01); *G06K 9/6201* (2013.01); *G06K 9/6215* (2013.01);
(Continued)

(58) Field of Classification Search
CPC ... G06K 9/6211; G06K 9/6201; G06K 9/6215
See application file for complete search history.

(56) References Cited

U.S. PATENT DOCUMENTS

| 7,406,197 B2 | 7/2008 | Francos et al. |
| 7,865,020 B2 | 1/2011 | Francos et al. |
(Continued)

OTHER PUBLICATIONS

International Search Report for PCT/IL2017/050332 issued by European Patent Office dated Jul. 7, 2017.
Witten Opinion of the International Searching Authority for PCT/IL2017/050332 issued by European Patent Office dated Jul. 7, 2017.
K. Mikolajczyk, C. Schmid; "A Performance Evaluation of Local Descriptors"; Proceedings of the 2003 IEEE Computer Society Conference on Computer Vision and Pattern Recognition; Jun. 2003, vol. 2, pp. 257-263, IEEE New York, N.Y.
(Continued)

*Primary Examiner* — Md K Talukder
(74) *Attorney, Agent, or Firm* — Chanoch Kahn; Simon Kahn (57) ABSTRACT

An image comparison method constituted of: receiving images; point matching the images to identify tentatively corresponding points; responsive to the identified points, defining a plurality of first image tiles within the first image; defining a plurality of second image tiles within the second image, each corresponding to a respective first image tile; adjusting the intensity of a set of pixels responsive to the cumulative relative frequency of the respective pixel intensity within the respective tile; for each tile, applying a plurality of non-linear functions; for each function, separately determining a moment of the outcome of the respective non-linear function for each axis of the respective tile; for each first image tile and corresponding second image tile, determining a distance between the subspaces spanned by moment vectors; and responsive to determined distances, determining whether respective first and second image tiles comprise observations of the same portion.

15 Claims, 3 Drawing Sheets

(52) U.S. Cl.
CPC ...... *G06K 2009/6213* (2013.01); *G06T 7/248* (2017.01); *G06T 2207/20021* (2013.01)

(56) References Cited

U.S. PATENT DOCUMENTS

| | | | |
|---|---|---|---|
| 8,275,204 B1 | 9/2012 | Kovalsky et al. | |
| 2007/0031027 A1* | 2/2007 | Stansby | G06T 7/33 382/151 |
| 2009/0148051 A1* | 6/2009 | Pham | G06K 9/32 382/219 |
| 2012/0281921 A1* | 11/2012 | Dowell | G06T 3/0068 382/195 |
| 2014/0003695 A1* | 1/2014 | Dean | G06T 7/0012 382/131 |
| 2014/0211989 A1* | 7/2014 | Ding | G06K 9/6211 382/103 |
| 2014/0270570 A1* | 9/2014 | Litvinov | H04N 5/3675 382/275 |
| 2015/0254865 A1* | 9/2015 | Booth | G06T 5/40 382/237 |
| 2016/0078317 A1* | 3/2016 | Gu | G06K 9/6218 382/190 |
| 2019/0057281 A1* | 2/2019 | Francos | G06K 9/6215 |

OTHER PUBLICATIONS

Luc Van Gool et al; "Affine/ Photometric Invariants for Planar Intensity Patterns"; European Conference on Computer Vision (ECCV 1996), Apr. 1996, Springer Publishing, New York, N.Y., pp. 642-651.

Dou Jianfang, Jianxun Lii; "Image Matching Based Local Delaunay Triangulation and Affine Invariant Geometric Constraint", OPTIK, International Journal for Light and Electron Optics, vol. 125, No. 1, pp. 526-531, Published 2014 by Elsevier B.V.

Oren Katzir and Guy Gilboa; "A Maximal Interest-Point Strategy Applied to Image Enhancement with External Priors"; 2015 IEEE International Conference on Image Processing, pp. 1324-1328, published 2015 by IEEE New York, N.Y.

Flusser et al., "A Moment-Based Approach to Registration of Images with Affine Geometric Distortion", IEEE Transactions on Geoscience and Remote Sensing, vol. 32, No. 2 Mar. 1994, New York, US.

Office action issued by European patent office for parallel application 17721870.8-1207 dated Jan. 28, 2020.

* cited by examiner

IMAGE COMPARISON SYSTEM AND METHOD

CROSS-REFERENCE TO RELATED APPLICATIONS

This application claims priority from U.S. provisional application Ser. No. 62/308,751, filed Mar. 15, 2016 and entitled "GEOMETRY AND RADIOMETRY INVARIANT MATCHED MANIFOLD DETECTION TRACKING AND RECOGNITION SYSTEM AND METHOD", the entire contents of which are incorporated herein by reference.

TECHNICAL FIELD

The present invention relates generally to the field of image processing, and in particular to an image comparison system and method.

BACKGROUND

U.S. Pat. No. 7,406,197, issued Jul. 29, 2008 to Francos et al., and U.S. Pat. No. 786,502, issued Jan. 4, 2011 to Francos et al., the entire contents of each which is incorporated herein by reference, are addressed to a parametric estimation of multi-dimensional homeomorphic transformations. U.S. Pat. No. 8,275,204, issued Sep. 25, 2012 to Kovalsky et al., the entire contents of which are incorporated herein by reference, is addressed to an estimation of joint radiometric and geometric image deformations.

Analyzing and understanding different appearances of an object is an elementary problem in various fields. Since acquisition conditions vary (e.g., pose, illumination), the set of possible observations on a particular object is immense. We consider a problem where, in general, we are given a set of observations (for example, images) of different objects, each undergoing different geometric and radiometric deformations. As a result of the action of the deformations, the set of different realizations of each object is generally a manifold in the space of observations. Therefore, the detection and recognition problems are strongly related to the problems of manifold learning and dimensionality reduction of high dimensional data that have attracted considerable interest in recent years, see e.g., "Special Issue on Dimensionality Reduction Methods," Signal Process. Mag., issued March 2011, the entire contents of which are incorporated herein by reference. The common underlying idea unifying existing manifold learning approaches is that although the data is sampled and presented in a high-dimensional space, for example because of the high resolution of the camera sensing the scene, in fact the intrinsic complexity and dimensionality of the observed physical phenomenon is very low.

The problem of characterizing the manifold created by the multiplicity of appearances of a single object in some general setting is studied intensively in the field of non-linear dimensionality reduction. As indicated in "Unsupervised Learning of Image Manifolds by Semidefinite Programming", by K. Weinberger and L. Saul, published in Int. J. Comput. Vision, pp. 77-90, 2006, the entire contents of which are incorporated herein by reference, linear methods for dimensionality reduction such as PCA and MDS generate faithful projections when the observations are mainly confined to a single low dimensional linear subspace, while they fail in case the inputs lie on a low dimensional non-linear manifold. Hence, a common approach among existing non-linear dimensionality reduction methods is to expand the principles of the linear spectral methods to low-dimensional structures that are more complex than a single linear subspace. This is achieved, for example, by assuming the existence of a smooth and invertible locally isometric mapping from the original manifold to some other manifold which lies in a lower dimensional space, as described in: "Learning to Traverse Image Manifolds", by P. Dollar, V. Rabaud and S. Belongie, published in *Proc. NIPS*, 2006; "A Global Geometric Framework for Nonlinear Dimensionality Reduction", by J. B. Tenenbaum, V. de Silva and J. C. Langford, published in *Science*, vol. 290, pp. 2319-2323, 2000; and "Nonlinear Dimensionality Reduction by Locally Linear Embedding", by S. T. Roweis and L. K. Saul, published in *Science*, vol. 290, pp. 2323-2326, 2000, the entire contents of each of with are incorporated herein by reference.

An additional family of widely adopted methods aims at piecewise approximating the manifold or a set of manifolds, as a union of linear subspaces, in what is known as the subspace clustering problem, as described in: "Estimation of subspace arrangements with applications in modeling and segmenting mixed data", by Y. Ma, A. Yang, H. Derksen, and R. Fossum, published in *SIAM Rev.*, vol. 50, no. 3, pp. 413-458, 2008; and "Subspace Clustering", by R. Vidal, published in *Signal Process. Mag.*, pp. 52-67, March 2011, the entire contents of each of which are incorporated herein by reference. The challenge here is to simultaneously cluster the data into multiple linear subspaces and to fit a low-dimensional linear subspace to each set of observations. A different assumption, namely that the data has a sufficiently sparse representation as a linear combination of the elements of an a-priori known basis or of an over-complete dictionary, as described in: "Greed is good: Algorithmic results for sparse approximation", by J. Tropp, published in *IEEE Trans. Info. Theory*, vol. 50, no. 10, pp. 2231-2242, 2004; and "Dictionary Learning", by I. Tosic and P. Frossard, published in *Signal Process. Mag.*, pp. 27-38, March 2011, the entire contents of each of which is incorporated herein by reference. This leads to the framework of linear dictionary approximations of the manifolds. Geometrically, this assumption implies that the manifold can be well approximated by its tangent plane, with the quality of this approximation depending on the local curvature of the manifold.

Indeed, there are many cases where no prior knowledge on the reasons for the variability in the appearances of an object is available. On the other hand, there are many scenarios in which such information is inherently available, and hence can be efficiently exploited.

Typically, to compare different images, point matching algorithms and/or or global registration algorithms are utilized. Point matching algorithms aim at finding key points in the observed image and characterize them through the properties of small regions around them. These inherently local approaches use relatively small amounts of information (small patches) in generating the descriptor of a key point. As a consequence they frequently result in ambiguous descriptors, which in turn lead to high rates of false matches that need to be eliminated before any further processing can take place. Such verification procedures require knowledge of the global geometric transformation model (e.g., RANSAC) and are computationally demanding. Moreover, such global geometric transformation model is often unknown, or difficult to estimate. On the other end, global registration algorithms may be applied only when the family of expected geometric deformations is a-priori known, and the radiometric deformations between the two observations are minimal.

SUMMARY OF THE INVENTION

Accordingly, it is a principal object of the present invention to overcome disadvantages of prior art methods and systems of image comparison. This is accomplished in one embodiment by an image comparison method, the method comprising: receiving a first image and a second image; point matching the first image with the second image to identify tentatively corresponding points in the first and second images; responsive to the identified points, defining a plurality of first image tiles within the received first image; responsive to the identified points, defining a plurality of second image tiles within the received second image, each of the plurality of second image tiles corresponding to a respective one of the plurality of first image tiles; for each of the first image tiles and second image tiles, adjusting the intensity of each of a set of pixels responsive to the cumulative relative frequency of the intensity level of the respective pixel within the respective tile; for each of the intensity adjusted image tiles, applying a plurality of non-linear functions to the respective image tile; for each of the applied non-linear functions, separately determining a moment of the outcome of the respective non-linear function for each of a plurality of pixel coordinate axes of the respective image tiles thereby defining a plurality of vectors, each of the plurality of vectors defined by the determined moments for a respective one of the plurality of pixel coordinate axes; for each of the first image tiles, determining a distance between a subspace which is spanned by the defined vectors of the respective first image tile and a subspace which is spanned by the defined vectors of the corresponding second image tile; for each of the first image tiles, responsive to the determined distances and a distance rule, determining whether the respective first image tile and its corresponding second image tile comprise observations of the same portion; and outputting an indication of the portions determination.

In one embodiment, the method further comprises, for each of the first and second image tiles, determining a projection matrix on the subspace spanned by the respective defined vectors, wherein the distance determination comprises comparing the determined projection matrix on the subspace spanned by the defined vectors of the respective first image tile to the determined projection matrix on the subspace spanned by the defined vectors of the corresponding second image tile. In one further embodiment, the method further comprises, for each of the first image tiles: determining a difference between the determined projection matrix on the subspace spanned by the defined vectors of the respective first image tile and the determined projection matrix on the subspace spanned by the defined vectors of the corresponding second image tile; and determining a Frobenius norm of the determined projection matrix difference, wherein the determined distances are the determined Frobenius norms.

In one embodiment, the first image tiles are defined by determining a Delaunay triangulation on the identified tentatively corresponding points, wherein each of the defined plurality of second image tiles is a triangle whose vertices correspond to vertices of the corresponding first image tile. In another embodiment, the plurality of first image tiles comprises a plurality of sets of first image tiles, the tiles of each of the plurality of sets of first image tiles exhibiting a common geometric constraint different than a respective common geometric constraint of each of the others of the plurality of sets of first image tiles.

In one embodiment, the method further comprises: responsive to an object rule, determining whether the portions are of the same object; and outputting an indication of the object determination.

In one independent embodiment, an image comparison system is provided, the image comparison system comprising: a processor; and a memory, the memory having stored thereon instructions which when run by the processor cause the processor to: receive a first image and a second image; point match the first image with the second image to identify tentatively corresponding points in the first and second images; responsive to the identified points, define a plurality of first image tiles within the received first image; responsive to the identified points, define a plurality of second image tiles within the received second image, each of the plurality of second image tiles corresponding to a respective one of the plurality of first image tiles; for each of the first image tiles and second image tiles, adjust the intensity of each of a set of pixels responsive to the cumulative relative frequency of the intensity level of the respective pixel within the respective tile; for each of the intensity adjusted image tiles, apply a plurality of non-linear functions to the respective image tile; for each of the applied non-linear functions, separately determine a moment of the outcome of the respective non-linear function for each of a plurality of pixel coordinate axes of the respective image tiles thereby defining a plurality of vectors, each of the plurality of vectors defined by the determined moments for a respective one of the plurality of pixel coordinate axes; for each of the first image tiles, determine a distance between a subspace which is spanned by the defined vectors of the respective first image tile and a subspace which is spanned by the defined vectors of the corresponding second image tile; for each of the first image tiles, responsive to the determined distances and a distance rule, determine whether the respective first image tile and its corresponding second image tile comprise observations of the same portion; and output an indication of the portions determination.

In one embodiment, the instructions are further arranged, for each of the first and second image tiles, to cause the processor to determine a projection matrix on the subspace spanned by the respective defined vectors, wherein the distance determination comprises a comparison of the determined projection matrix on the subspace spanned by the defined vectors of the respective first image tile to the determined projection matrix on the subspace spanned by the defined vectors of the corresponding second image tile. In one further embodiment, the instructions are further arranged, for each of the first image tiles, to cause the processor to: determine a difference between the determined projection matrix on the subspace spanned by the defined vectors of the respective first image tile and the determined projection matrix on the subspace spanned by the defined vectors of the corresponding second image tile; and determine a Frobenius norm of the determined projection matrix difference, wherein the determined distances are the determined Frobenius norms.

In one embodiment, the first image tiles are defined by determining a Delaunay triangulation on the identified tentatively corresponding points, wherein each of the defined plurality of second image tiles is a triangle whose vertices correspond to vertices of the corresponding first image tile. In another embodiment, the plurality of first image tiles comprises a plurality of sets of first image tiles, the tiles of each of the plurality of sets of first image tiles exhibiting a common geometric constraint different than a respective common geometric constraint of each of the others of the plurality of sets of first image tiles.

In one embodiment, the instructions are further arranged to cause the processor to: responsive to an object rule, determine whether the portions are of the same object; and output an indication of the object determination.

In another independent embodiment, an image comparison system is provided, the image comparison system comprising: a communication module, the communication module arranged to receive a first image and a second image; a point matching module, the point matching module arranged to point match the first image with the second image to identify tentatively corresponding points in the first and second images; a tile module, the tile module arranged, responsive to the identified points, to: define a plurality of first image tiles within the received first image, and define a plurality of second image tiles within the received second image, each of the plurality of second image tiles corresponding to a respective one of the plurality of first image tiles; an intensity adjustment module, the intensity adjustment module arranged, for each of the first image tiles and second image tiles, to adjust the intensity of each of a set of pixels responsive to the cumulative relative frequency of the intensity level of the respective pixel within the respective tile; a non-linear function module, the non-linear function module arranged, for each of the intensity adjusted image tiles, to apply a plurality of non-linear functions to the respective image tile; a moment module, the moment module arranged, for each of the applied non-linear functions, to separately determine a moment of the outcome of the respective non-linear function for each of a plurality of pixel coordinate axes of the respective image tiles thereby defining a plurality of vectors, each of the plurality of vectors defined by the determined moments for a respective one of the plurality of pixel coordinate axes; a distance module, the distance module arranged, for each of the first image tiles, to determine a distance between a subspace which is spanned by the defined vectors of the respective first image tile and a subspace which is spanned by the defined vectors of the corresponding second image tile; an object observation module, the object observation module arranged, for each of the first image tiles, responsive to the determined distances and a distance rule, to determine whether the respective first image tile and its corresponding second image tile comprise observations of the same portion; and an output module, the output module arranged to output an indication of the portions determination.

In one embodiment, the system further comprises a projection module, the projection module arranged, for each of the first and second image tiles, to determine a projection matrix on the subspace spanned by the respective defined vectors, wherein the distance determination by the distance module comprises a comparison of the determined projection matrix on the subspace spanned by the defined vectors of the respective first image tile to the determined projection matrix on the subspace spanned by the defined vectors of the corresponding second image tile. In one further embodiment, the distance module is further arranged to: determine a difference between the determined projection matrix on the subspace spanned by the defined vectors of the respective first image tile and the determined projection matrix on the subspace spanned by the defined vectors of the corresponding second image tile; and determine a Frobenius norm of the determined projection matrix difference, wherein the determined distances are the determined Frobenius norms.

In one embodiment, the plurality of first image tiles are defined by determining a Delaunay triangulation on the identified tentatively corresponding points, wherein each of the defined plurality of second image tiles is a triangle whose vertices correspond to vertices of the corresponding first image tile. In another embodiment, the plurality of first image tiles comprises a plurality of sets of first image tiles, the tiles of each of the plurality of sets of first image tiles exhibiting a common geometric constraint different than a respective common geometric constraint of each of the others of the plurality of sets of first image tiles.

In one embodiment, the object observation module is further arranged, responsive to an object rule, to determine whether the portions are of the same object, wherein the output module is further arranged to output an indication of the object determination.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF THE PREFERRED EMBODIMENTS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1A:
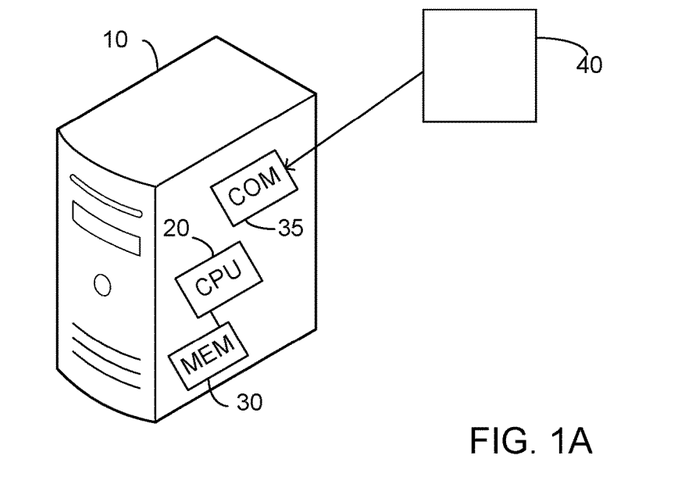
FIG. 1A illustrates a high level schematic diagram of a geometry and radiometry invariant matched manifold detection tracking and recognition system, according to certain embodiments.

FIG. 1A illustrates a high level schematic diagram of an image comparison system 10, system 10 comprising: a processor 20; a memory 30; and a communication module 35. In one embodiment, processor 20 is arranged to operate responsive to instructions stored on memory 30. Communication module 35 is in communication with an image input source 40. In one embodiment, image input source 40 is a user input device, such as an imaging device. In another embodiment, image input source 40 is a network.

Figure 1B:
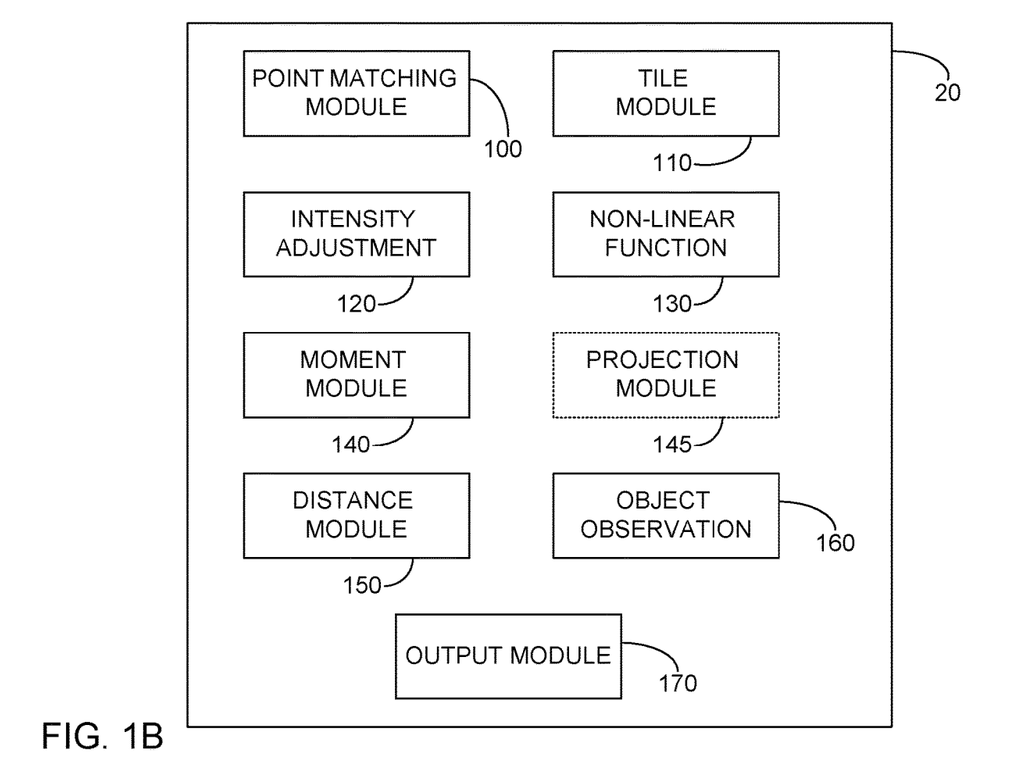
FIG. 1B illustrates a high level block diagram of an embodiment of a processor of the system of FIG. 1A.

FIG. 1B illustrates a high level block diagram of an embodiment of processor 20, comprising: a point matching module 100; a tile module 110; an intensity adjustment module 120; a non-linear function module 130; a moment module 140; an optional projection module 145; a distance module 150; an object observation module 160; and an output module 170. In one embodiment, each of point matching module 100, tile module 110, intensity adjustment module 120; non-linear function module 130, moment module 140, optional projection module 145, distance module 150, object observation module 160 and output module 170 are implemented by dedicated code stored on memory 30 or dedicated circuitry. The operation of system 10 will be described herein in relation to the high level flow chart of FIG. 2.

Figure 2:
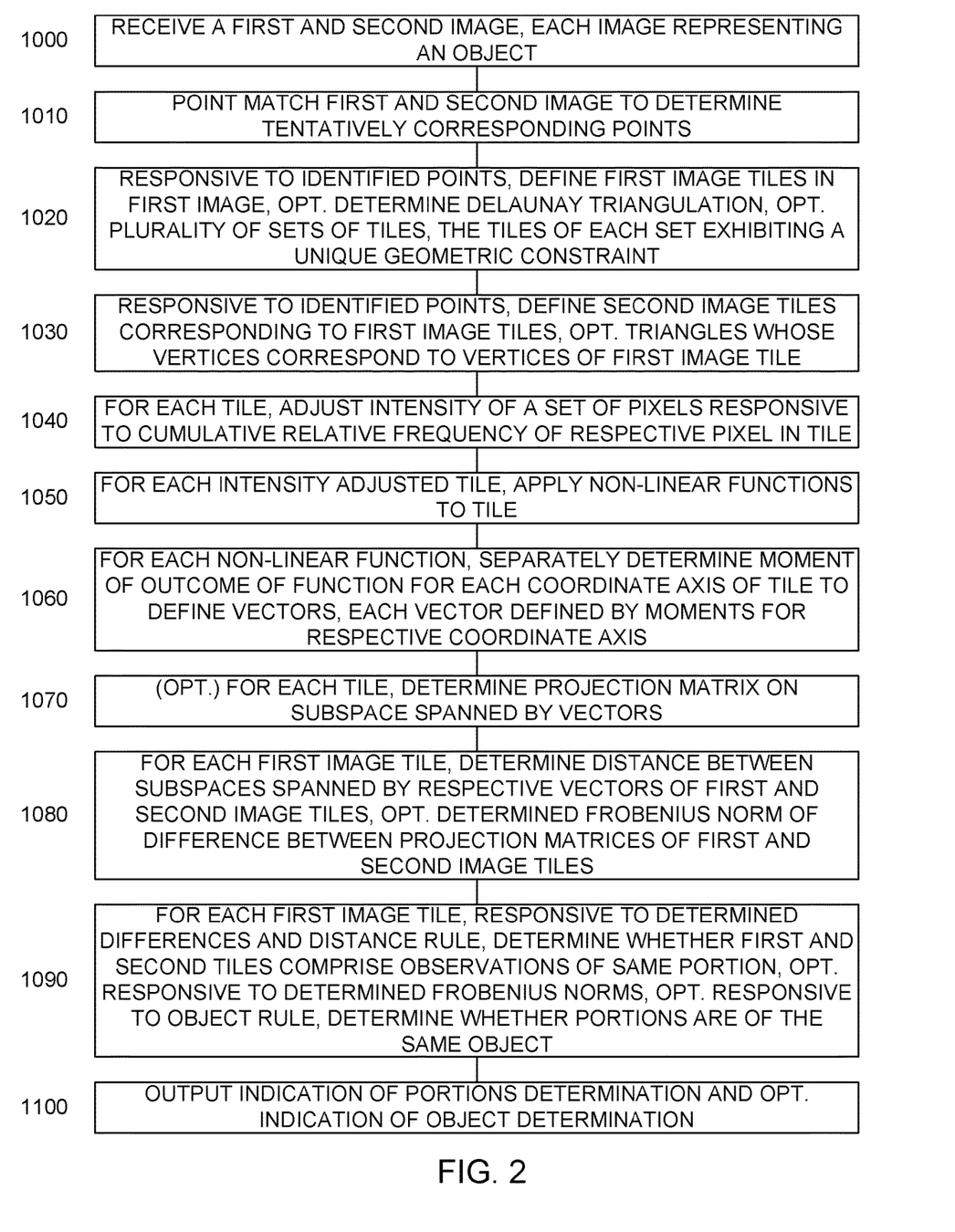
FIG. 2 illustrates a high level flow chart of a method of operation of the system of FIGS. 1A-1B for images with single objects, according to certain embodiments.

FIG. 2 illustrates a high level flow chart of the operation of system 10. In stage 1000, a first image and a second image are received by communication module 35 from image input source 40 and optionally stored on memory 30. In stage 1010, point matching module 100 applies a point matching algorithm to the received first and second images to identify tentatively corresponding points in the two images, i.e. points in both images which exhibit certain similarities, as known to those skilled in the art at the time of the invention. In one non-limiting embodiment, a scale-invariant feature transform (SIFT) algorithm is used to identify the tentatively corresponding points.

In stage 1020, responsive to the identified points of stage 1010, tile module 110 defines a plurality of tiles within the received first image of stage 1000 such that a portion of the first image is separated into a plurality of tiles defined by the identified points, i.e. the plurality of tiles comprise the portion of the first image which exhibits similarities with a portion of the second image. The term 'tile' as used herein means a section of the image and is not meant to be limiting in any way. In one preferred embodiment, the portion of the image is tessellated into a plurality of disjoint tiles, i.e. they do not overlap each other. In one embodiment, the first image tiles are defined by applying the Delaunay triangulation to the identified points. In another embodiment, a geometric constraint is applied to the defined tiles. In one further embodiment, each tile is defined as a triangle with its shortest side comprising a number of pixels greater than a predetermined value. In one embodiment, a plurality of sets of tiles are defined within the first image, such that each set of tiles comprises the portion of the first image identified by point matching module 100. In such an embodiment, each set of tiles exhibits a common geometric constraint different than the common geometric constraint of the tiles of each of the other sets. For example, the tiles of a first set are each defined such that the shortest side of each tile in the first image is greater than a first predetermined value, the tiles of a second set are each defined such that the shortest side of each tile in the first image is greater than a second predetermined value and the tiles of a third set are each defined such that the shortest side of each tile in the first image is greater than a third predetermined value. In one non-limiting embodiment, three sets of triangular shaped tiles are defined, each set of triangles covering the portion of the first image defined by the identified points. In one further non-limiting embodiment, the minimum length for a triangle side in the first set of tiles is 20 pixels, the minimum length for a triangle side in the second set of tiles is 40 pixels and the minimum length for a triangle side in the third set of tiles is 80 pixels.

In stage 1030, responsive to the identified points of stage 1010, tile module 110 defines tiles in the second image, each of the defined second image tiles corresponding to a respective one of the defined first image tiles of stage 1020. Specifically, each second image tile is defined by identified points in the second image which correspond to identified points in the first image which define the corresponding first image tile. In the embodiment where the first image tiles of stage 1020 are defined by triangulation of identified points in the first image, tile module 110 defines each second image tile as a triangle whose vertices correspond to the vertices of the corresponding first image tile. Specifically, the vertices of the second image tile are the identified points of stage 1010 in the second image which correspond to the identified points in the first image which are the vertices of the corresponding first image tile. In the embodiment of stage 1020 where a plurality of sets of first image tiles are defined, a plurality of sets of corresponding second image tiles are similarly defined. Specifically, for each set of first image tiles, a set of second image tiles are defined, each second image defined by the identified points which correspond to the identified points which define the corresponding first image tile of the respective set. Defining different sets of tiles, each set exhibiting different geometric constraints, increases the chance of correctly matching each pixel in the first image with its corresponding pixel in the second image, if indeed the tiles on each image represent different observations of the same object related by a simultaneous affine transformation of coordinates and a monotonic mapping of the intensities. Particularly, the chances of this increase the smaller the tiles are, however larger tiles contain more information for comparison. Therefore, several sets of tiles of different sizes are utilized in order to make a more accurate comparison.

In stage 1040, for each first image tile and second image tile of stages 1020-1030, intensity adjustment module 120 adjusts the intensity of each of a set of pixels within the respective tile responsive to the cumulative relative frequency of the intensity value of the respective pixel within the respective tile. In one embodiment, the intensity of each of the set of pixels within each tile is replaced with the cumulative relative frequency of the intensity value of the respective pixel within the respective tile, however this is not meant to be limiting in any way and the pixel intensity level can be replaced with a predetermined function of the cumulative relative frequency of the intensity value of the pixel without exceeding the scope. In one further embodiment, the intensity value of each pixel with a non-zero intensity value is replaced with the cumulative relative frequency of that pixel's intensity value within the respective tile. As will be described below, using the cumulative relative frequency to adjust the pixel intensity provides a new representation of the image which won't change significantly due to radiometric changes in the original image.

In stage 1050, for each intensity adjusted tile of stage 1040, non-linear function module 130 applies a plurality of non-linear functions to the adjusted pixels of the respective tile. In one non-limiting embodiment, the plurality of non-linear functions are given as:

$$w_i(x) = \begin{cases} 1 & \frac{i-1}{M} < x \leq \frac{1}{M} \\ 0 & \text{else} \end{cases} \quad \text{(EQ. 1)}$$

where $w_i$ is the non-linear function for each index i which increases from 1 to a predetermined number denoted M and x is the adjusted pixel intensity of stage 1040. As described above in relation to stage 1040, each adjusted pixel intensity is in one embodiment the cumulative relative frequency of the non-zero pixel intensities of the tile in the original image and therefore the adjusted intensity values are between 0 and 1. In this embodiment, each non-linear function w, thus outputs a representation of the tile where the values of each pixel is either 1 or 0 such that each representation of the tile indicates the positions of pixels in the original image which exhibit intensities within a specific range. In another non-limiting embodiment, at least 6 non-linear functions are applied to the adjusted pixels of each tile. In such an embodiment, the pixel intensities of the original tile are essentially split into 6 ranges, in accordance with their cumulative relative frequency, and the outcome of each non-linear function represents the positions of the pixels of the respective range.

In stage 1060, for each non-linear function of stage 1050, moment module 140 separately determines a moment of the outcome of the respective non-linear function for each of a plurality of pixel coordinate axes of the respective image tiles. Particularly, as described below in relation to (EQ. 7), for each respective image tile, each pixel coordinate axis, i.e. the pixel coordinates in each axis, is separately multiplied with the outcome of each non-linear function. An integral of the outcome of each multiplication is then calculated to determine the respective moment. Thus, for each of the axes of the respective image tile, the moment of the outcome of each non-linear function is determined. The determined moments define a plurality of vectors, each of the plurality of vectors defined by the determined moments for a respective one of the plurality of pixel coordinate axes, i.e. each vector comprises the integrals of the outcomes of the multiplications of the outcomes of the non-linear functions with a respective one of the pixel coordinate axes. In one embodiment, as illustrated below in relation to (EQ. 7), each vector is a respective column of a matrix T. It is noted that the use of the term 'vector' is not meant to limit the storage method of the data to a 1-dimensional array format. Rather, the vector is defined mathematically as a plurality of determined moments in respect to the respective pixel coordinate axis, each determined moment associated with a respective one of the plurality of non-linear functions, regardless of how the determined moments are stored in memory 30. For example, if each determined moment is stored in a separate variable, the group of determined moments for the respective axis is considered a 'vector'.

In optional stage 1070, for each image tile, optional projection module 145 determines a projection matrix on a subspace spanned by the defined vectors of stage 1060. In one embodiment, as described below in relation to (EQ. 7), a matrix T is defined whose columns are the determined vectors of stage 1060 such that each row represents the determined moments of the outcome of a respective one of the plurality of non-linear functions of stage 1050. In such an embodiment, a projection matrix P of matrix T is determined, projection matrix P given as:

$$P=T((T)^T T)^{-1}(T)^T \qquad (EQ. 2)$$

In stage 1080, for each first image tile, distance module 150 determines a distance between a subspace which is spanned by the defined vectors of stage 1060 of the respective first image tile and a subspace which is spanned by the defined vectors of the second image tile, which corresponds to the respective first image tile, as described above in relation to stage 1030. The subspace is spanned by the vectors when the vectors are set up such that the order of the moments in the vectors, for the different non-linear functions, are the same. For example, in each of the vectors the first element is associated with the first non-linear function, the second element is associated with the second non-linear function, the third element is associated with the third non-linear function, etc, as illustrated below in relation to (EQ. 7). As explained above, this is regardless of how the determined moments are stored on memory 30 by processor 20 since there are numerous ways of storing the values of the determined moments in arrays and/or variables. Although there are numerous ways of storing the values of the determined moments, when the distance between the subspaces is determined it is in accordance with the mathematical vectors which are defined as described below in relation to (EQ. 7) and the computations are adjusted accordingly, i.e. any mathematical method used for determining the distances between subspaces is adjusted according to how the determined moments are stored.

In one embodiment, distance module 150 determines the distance between the two subspaces by: determining the difference between the determined projection matrix of optional stage 1070 of the respective first image tile and the determined projection matrix of the corresponding second image tile; and determining the Frobenius norm of the determined projection matrix difference, as described below in relation to EQ. 14. As described above, there are numerous ways of storing the values of the determined moments of stage 1060. Regardless of how the moment values are stored, the projection matrix of optional stage 1070 is determined in accordance with (EQ. 2) as if the values are stored in a matrix as defined below in (EQ. 7). If the values are stored in a different format, the computations for (EQ. 2) are adjusted to arrive at the mathematical equivalence of projection matrix P.

In stage 1090, responsive to the determined distances of stage 1080, and further responsive to a predetermined distance rule, object observation module 160 determines, for each first image tile and its corresponding second image tile, whether the pair of tiles comprise observations of the same portion, which is tentatively the same portion of a particular object. Particularly, in the event that the determined distance between the subspaces of a pair of tiles is less than a predetermined distance value, object observation module 160 determines that the tiles are similar and comprise observations of the same portion. Similar tiles indicate that the portion of the first and second images which are contained within the pair of tiles are similar and may be a same portion of a larger object. However, it is possible that a pair of tiles are similar and yet they merely represent similar portions of separate objects, as will be described below. In one embodiment, the predetermined distance rule comprises a rule regarding the determined Frobenius norms of stage 1080. In one further embodiment, object observation module 160 compares the determined Frobenius norm associated with each pair of image tiles to a predetermined threshold value. In one non-limiting embodiment, the predetermined threshold value is 0.1. In the event that the determined Frobenius norm is less than the predetermined threshold value it is decided that the pair of tiles are tentatively observations on the same portion of the same object.

In one embodiment, responsive to the determined differences of stage 1080 and a predetermined object rule, object observation module 160 determines whether the received first and second images comprise observations of the same object which are represented by the identified pairs of tiles.

In one embodiment, in the event that the determined Frobenius norms associated with at least a predetermined number, or predetermined percentage, of corresponding first image tiles and second image tiles are less than the predetermined threshold, object observation module 160 determines that the first and second image comprise observations of the same object which is represented by the identified pairs of tiles. In the event that the number of determined Frobenius norms which are less than the predetermined threshold is less than, or equal to, the predetermined number, object observation module 160 determines that the first and second image do not comprise observations of the same object. In one non-limiting embodiment, in the event that at least 60% of the determined Frobenius norms are less than the predetermined threshold, i.e. at least 60% of the defined pairs of tiles of stages 1020-1030 are determined to be observations of the same portion, object observation module 160 determines that the received first and second images of stage 1000 comprise observations of the same object which is represented by the identified pairs of tiles. In the event that less than 60% of the determined Frobenius norms are less than the predetermined threshold, object observation module 160 determines that the received first and second images do not comprise observations of the same object, even though some of the pairs of tiles contain similar pixels. Although the above examples of a distance rule and object rule have been described in relation to thresholds of 0.1 and 60%, respectively, this is not meant to be limiting in any way.

In another embodiment, the comparison rule comprises a predetermined function of the determined Frobenius norms, such as an average, or other function.

In the embodiment described in relation to stage 1020 where a plurality of sets of tiles are defined for each image, object observation module 160 optionally determines the total number of determined Frobenium norms which are less than the predetermined threshold and compares the determined total number to a predetermined value to determine whether the first and second image comprise observations of the same object. In another embodiment, for each set object observation module 160 separately determines the number of determined Frobenius norms which are less than the predetermined threshold and determines whether the first and second image comprise observations of the same object responsive to a predetermined function of the result for each set. In another embodiment, object observation module 160 determines that a pixel within a first image tile is an observation of the same portion as a corresponding pixel in the corresponding second image tile only if that pixel is contained within a plurality of pairs of tiles from different sets whose Frobenius norms are less than the predetermined threshold value.

It is noted that the above method is utilized regardless of the number tentatively corresponding objects and tiles in the first and second image. In the event that the comparisons of stage 1080 indicate that a first clusters of tiles within the first and second images are observations of the same object and the comparisons of stage 1080 further indicate that a second cluster of tiles within the first and second images are observations of the same object, object observation module 160 determines that the first and second images both comprise observations of two objects. The same is true for any number of objects.

In stage 1100, output module 170 outputs information indicating which of the identified pairs of tiles of stages 1020-1030 comprise observations of the same portion and the correspondences of each pixel in the identified regions in the first image to their locations in the second image. In one embodiment, output module 170 further outputs information indicating whether the received first and second images of stage 1000 comprise observations of the same object, and the correspondences of each pixel in the identified regions in the first image to their locations in the second image. In one embodiment, the information output by output module 170 further indicates the coordinates of the object within the first and second image.

Advantageously, the above described system and method allows the objects identified in the received first and second image to be tracked over time. Specifically, processor 20 in one embodiment determines any difference in position of the object within the first and second images, thereby determining the direction and speed of a moving object. Additionally, when a third image is received later on image input module 40, processor 20 is arranged to compare the third image to the first or second image, as described above, to determine whether the common object of the first and second image is in the third image, and optionally processor 20 is further arranged to determine the change in position of the object. Alternately, similar portions of two images are identified, regardless of whether they belong to the same object.

Although the above has been described in relation to a first and second image, this is not meant to be limiting in any way. In another embodiment, any number of images may be received, and the images compared to each other as described above to identify different observations of the same object.

The below is a mathematical explanation of the above described method:

Problem Definition

Suppose we are given two observations g and h, on the same object. The two observations are related by an affine transformation of the geometry of the object and a monotonic transformation of the measured amplitudes, i.e., $$h(x)=U(g(\mathcal{A}(x))), \qquad (EQ. 3)$$

where U is strictly monotonic and $\mathcal{A}$ is affine. The right-hand composition of g with $\mathcal{A}$ represents the spatial affine deformation, while the left-hand composition with U represents the radiometric transformation applied to the signal's amplitude.

More precisely, let $\mathcal{O}$ be the space of observations (for example, images), let $\tilde{\mathcal{A}}$ be the set of possible affine deformations of the object geometry, $\mathcal{U}$ the set of monotonic one-dimensional transformations, and let S be a set of known objects, where each object is modeled as a compact support, bounded, and Lebesgue measurable (or more simply, integrable) function from $\mathbb{R}^n$ to $\mathbb{R}$.

We assume that the observations are the result of the following procedure: We choose an object g∈S and some geometric-radiometric transformation pair ($\mathcal{A}$, U) in $\tilde{\mathcal{A}} \times \mathcal{U}$. An operator $\psi:S \times \tilde{\mathcal{A}} \times \mathcal{U} \to \mathcal{O}$ acts on the chosen object g such that it jointly undergoes an affine geometric deformation $\mathcal{A}$, and a monotonic radiometric transformation U, producing an observation such as h (or g, in case both the radiometric and geometric deformations are the identity transformation) above. For a specific object g∈S we will denote by $\psi_g$ the restriction of the map to this object. For any object (function) g∈S the set of all possible observations on this particular function is denoted by $\tilde{S}_g$. We refer to this subset as the orbit of g under the direct product $\tilde{\mathcal{A}} \times \mathcal{U}$. In general, this subset is a non-linear manifold in the space of observations. The orbit of each function forms a different manifold.

The space $O$ has a very high dimension (e.g., the number of pixels in an image). It is composed of the union of orbits, $\tilde{S}_g$, of the different objects g in S such that each orbit $\tilde{S}_g$ is the result of the action of $1\tilde{\mathcal{A}} \times U$ on the object g. As indicated earlier, existing non-linear dimensionality reduction methods rely on dense sampling of $\tilde{S}_g$ to obtain its description using local linear approximations, or alternatively, provide only an approximate description of the manifold.

We show here, by construction, that under the above assumptions there exists a linear space H which we call the reduced space, and a pair of maps $R: O \to O$ and $T: O \to H$ such that the compositemap $T \circ R \circ \psi_g$: $\tilde{\mathcal{A}} \times U \to H$ is invariant to the action of U and is linear in the parameters defining $\tilde{\mathcal{A}}$. This construction holds for every object $g \in S$, and any monotonic transformation of its amplitudes. The maps T and R are independent of the object. We call the map L=T∘R, radiometry invariant universal manifold embedding (RIUME) as it universally maps each of the different manifolds, where each manifold corresponds to a single object, into a different linear subspace of H. The map $\psi_g$: $\tilde{\mathcal{A}} \times U \to O$ maps $\tilde{\mathcal{A}} \times U$ non-linearly and represents the physical relation between the object and the observations on it. For any fixed pose of an object, the map R projects the entire set of observations related by monotonic amplitude transformations, to a unique point on the canonic manifold which represents the orbit of geometry-only deformations of the object. The map T then maps the result non-linearly so that the overall map $L \circ \psi_g: \tilde{A} \times U \to H$ is such that all observations from $\tilde{S}_g$ are mapped to the same distinct linear subspace $H_g$ of H.

We next provide a formal definition of the RIUME:
Definition 1. A radiometry invariant universal manifold embedding $L: O \to H$ is a map from the space of functions (observations) into a low dimensional Euclidean space, H, such that the set $L(\tilde{S}_g)$ is a linear subspace of H for any g, and invariant w.r.t. any monotonic transformation of the amplitudes of g.

Figure 3:
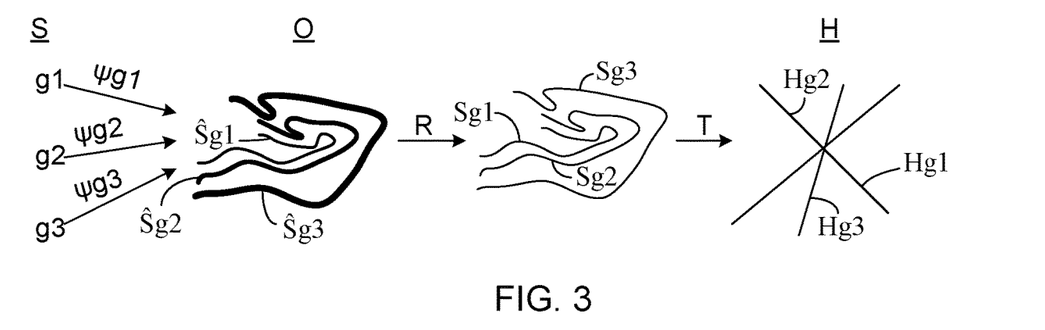
FIG. 3 illustrates a high level flow diagram of the principles of radiometry invariant universal manifold embedding (RIUME).

FIG. 3 schematically illustrates the concept of the radiometry invariant universal manifold embedding. Our aim is to find a map L such that $L(\tilde{S}_g)$ is a linear subspace of some linear space $H \subset \mathbb{R}^M$, universally for every $g \in S$, such that the map is independent of the deformation parameters.

As illustrated, from left to right:
1. Applying a set of possible radiometric and geometric deformations to some object g produces $\tilde{S}_g$ which is the set of all possible observations on g;
2. $\tilde{S}_g$ is a subset of the space of observations O;
3. The operator R maps each manifold to a radiometry normalized manifold, $S_g$;
4. All observations in $S_g$ are nonlinearly mapped by T to a single linear subspace $H_g = T(S_g)$.

The existence of the radiometry invariant universal embedding $L: O \to H$ implies that many problems concerning the multiplicity of appearances of an object can be directly solved in H using classical linear theory, eliminating the need to employ nonlinear analysis. Thus for example, in order to characterize the mapped manifold of some object in the linear space H all that is required is a single sample from the set of appearances of the object so that the linear subspace in H can be evaluated.

Radiometry Invariant Universal Manifold Embedding for Multi-Dimensional Affine Transformations Let $\mathbb{R}^n$ be the n-dimensional Euclidean space and let $\mathcal{A}: \mathbb{R}^n \to \mathcal{A}^n$ be an affine transformation of coordinates, that is, $y = \mathcal{A}(x)$ where $x, y \in \mathbb{R}^n$, i.e., $x = [x_1, x_2, \ldots, x_n]^T$, $y = [y_1, y_2, \ldots, y_n]^T$ such that $y = \mathcal{A}(x) = Ax + c$ and $x = A^{-1}y + b$, where $A \in GL_n(\mathbb{R})$ $b, c \in \mathbb{R}^n$. Let $\tilde{y} = [1, y_1, \ldots y_n]^T$. Thus, $x = D\tilde{y}$ where D is an $n \times (n+1)$ matrix given by $D = [b \, A^{-1}]$ that represents the geometric deformation. Hence, in this case the set of possible geometric transformations A is parameterized by D (or equivalently by A and c). Let $U: \mathbb{R} \to \mathbb{R}$ be an invertible function, representing the monotonic radiometric deformation.

The manifold of the function $g \in S$ is given by $\tilde{S} = \{U \circ g \circ \mathcal{A} \mid \mathcal{A} \in \tilde{\mathcal{A}}, U \in \mathcal{U}\}$ and our aim is to find a map L such that $L(\tilde{S}_g)$ is a linear subspace of some linear space $H \subset \mathbb{R}^M$, universally for every $g \in S$, such that the map is independent of the parameters of U and $\mathcal{A}$.

Radiometry-Invariant, Geometry-Covariant Representation

Consider the following mapping $R: O \to O$ of an observation g(x) to a new and "normalized" observation $\mathcal{G}(x)$, where $$\mathcal{G}(u) = \frac{\lambda[x : g(x) \leq g(u)]}{\lambda[supp\{g(x)\}]} \quad (EQ. 4)$$

Since $h = U \circ g \circ A$ we have, following the description in "Estimation of joint geometric and radiometric image deformations", by S. Z. Kovalsky, R. Hagege, G. Cohen, and J. M. Francos, published in *IEEE Trans. Pattern Anal. Mach. Intell.*, vol. 32, pp. 940-946, May 2010, the entire contents of which is incorporated herein by reference, that applying R to both h and g, the remapped observations $\mathcal{G}(x)$ and $\mathcal{H}(x)$ are related by the affine relation $$\mathcal{H}(x) = [\mathcal{G} \circ \mathcal{A}](x) = \mathcal{G}(\mathcal{A}(x)) \quad (EQ. 5)$$

Thus, (EQ. 5) represents an affine, geometric only, relation between the induced transformations of h and g by the operator R. In other words by applying the operator R, the dependence of the relation between h and g in the unknown radiometric deformation U, has been removed, while the resulting observations, $\mathcal{H}(x)$ and $\mathcal{G}(x)$ are two "new" observations related by an affine transformation $\mathcal{A}$. Thus, the operator R provides a radiometry-invariant representation of the manifold, and hence a radiometry-invariant-geometry-covariant relation between the products of applying it to any two objects h, $g \in \tilde{S}_g$. We next derive new representations for $\mathcal{H}(x)$ and $\mathcal{G}(x)$ that are invariant to the unknown affine transformation.

Radiometry Invariant Universal Manifold Embedding

Define an auxiliary function space, W, such that every function $w: \mathbb{R} \to \mathbb{R}$ W is bounded, Lebesgue measurable, and vanishes at zero. Next, we define the mapping from the space of observations to itself induced by the functions in W. More specifically, we define a mapping such that a function g (x) is mapped by w∈W to some function w (g(x)). This operator is, in general, non-linear.

Lemma 1. As described in "Parametric Estimation of Affine Transformations: An Exact Linear Solution", by R. Hagege and J. M. Francos, published in Jou. of Math. Imaging and Vision., pp. 1-16, January 2010, the entire contents of which are incorporated by reference, Let $\mathcal{G}$, $\mathcal{A} \in S_g$ be two observations on the same object such that $\mathcal{H} = \mathcal{G} \circ \mathcal{A}$ (i.e., U, the radiometric transformation, is the identity transformation). Let $M \in \mathbb{N}$ and let $w_l \in W$ $l=1, \ldots, M$ be a set of bounded, Lebesgue measurable functions $w_l: \mathbb{R} \to \mathbb{R}$, where $w_l(0)=0$. Let $D_k$ denote the kth row of the matrix D. Then, linear constraints (up to a scale factor) on the parametrization of $\mathcal{A}$ are found by applying functionals of the forms $\int_{\mathbb{R}^n} x_k w_l \circ \mathcal{A}(x) dx$ for some $w_l \in W$. These constraints take the form $$\int_{\mathbb{R}^n} x_k w_l \circ \mathcal{H}(x) dx = |A^{-1}| \int_{\mathbb{R}^n} (D_k \tilde{y}) w_l \circ \mathcal{G}(\tilde{y}) d\tilde{y}. \quad (\text{EQ. 6})$$

Inspecting equation (4) we conclude that application of each of the non-linear functions to the known relation $\mathcal{H}(X) = \mathcal{G}(\mathcal{A}(x))$ amounts to obtaining a linear constraint (up to a constant scale factor) on the affine transformation $\mathcal{A}$ between the centers of mass of the functions $w_l(\mathcal{H}(x))$ and $w_l(\mathcal{G}(x))$ obtained by an identical nonlinear operation on the amplitudes of $\mathcal{H}$ and $\mathcal{G}$. Thus, the proposed method employs stable "features" (centers of mass) rigorously extracted such that the correspondence between them is explicitly known.

Let $f$ be some observation on a deformable object and let $$T^{f,1} = \begin{bmatrix} \int_{\mathbb{R}^n} w_1 \circ f(y) & \int_{\mathbb{R}^n} y_1 w_1 \circ f(y) & \ldots & \int_{\mathbb{R}^n} y_n w_1 \circ f(y) \\ \vdots & & \ddots & \vdots \\ \int_{\mathbb{R}^n} w_M \circ f(y) & \int_{\mathbb{R}^n} y_1 w_M \circ f(y) & \ldots & \int_{\mathbb{R}^n} y_n w_M \circ f(y) \end{bmatrix} \quad (\text{EQ. 7})$$

where in general, the notation $T^{f,j}$ indicates that only moments of order less or equal to j, of $w_l \circ f$ are employed. Since in this subsection we consider only moments up to the first order, in the following we shall use the shorter notation $T^f$ instead of $T^{f,1}$, when we refer to $T^{f,1}$.

We next provide a constructive proof of existence of the RIUME:

Theorem 1. Let $g \in \tilde{S}_g$ and let $\{1, x_1, \ldots, x_n\}$ be the set of basis functions spanning the space of n-dimensional affine transformations. Let h be some other function in $\tilde{S}_g$ such that $h = U \circ g \circ \mathcal{A}$, and $\mathcal{A} \in \tilde{\mathcal{A}}$, $U \in \mathcal{U}$. Then, there exist a linear space $H \subset \mathbb{R}^M$ and a pair of maps $R: \mathcal{O} \to \mathcal{O}$ and $T: \mathcal{O} \to H$ such that the restriction of the composite map to $\tilde{S}_g$, denoted by $L^g$: $\mathcal{A} \times \mathcal{U}$, where $L^g = L \circ \psi_g = T \circ R \circ \psi_g$, is such that $L^g = T \circ R \circ \psi_g$ is a linear map (up to a fixed scale factor) from $\tilde{\mathcal{A}}$ to H, invariant of $\mathcal{U}$. Denote by $T^G$ the restriction of T to $R \circ \psi_g$. Then, $T^G$ is a linear map (up to a fixed scale factor) from $\tilde{\mathcal{A}}$ to H. As a linear operator on the parametrization of $\tilde{\mathcal{A}}$, $T^G$ admits a matrix representation, $T^G$ of the form (EQ. 8). The operator $L^g$ is invertible up to a monotonic amplitude transformation, if and only if $T^G$ is of rank n+1. The operator $L^g$ is independent of the parameters of $\mathcal{A}$ and U.

Proof. Since $h = U \circ g \circ \mathcal{A}$, we first apply the operator R defined in (EQ. 4) to the observations h and g in order to obtain their radiometry-invariant-geometry-covariant representations $\mathcal{H}(x)$ and $\mathcal{G}(x)$, respectively. Following (EQ. 5) we have that these representations are related by the affine relation $\mathcal{H}(x) = \mathcal{G}(\mathcal{A}(x))$.

Since the vectors in H are M-dimensional and since $L = T \circ R$, then in order to satisfy the required properties of L, we have that T has to be composed of M components $\{T_l\}_{l=1}^M$, where the e-th component of T is such that the e-th component of $T^G$, $T_\ell^G = T_l \circ (R \circ \psi_g)$ is a linear map from $\tilde{\mathcal{A}}$ to $\mathbb{R}$. In this case, $L^g$ is also a linear map from $\tilde{\mathcal{A}}$ to $\mathbb{R}$. Since by the previous step we have that $H = \mathcal{G} \circ \mathcal{A}$, we are looking for functionals $T_l(H)$ that are linear expressions (up to a scale factor) in the entries of D for any $\mathcal{G}$. We next construct $T_l$ and $T_\ell^G$. Using the notation of Lemma 1, we have by fixing k and by taking $l=1, \ldots, M$, that $T_l(\mathcal{H}) = \int_{\mathbb{R}^n} x_k w_l \circ \mathcal{H}(x) dx$. Hence, (EQ. 6) can be rewritten in the following form $$T_\ell^G D_k^T = |A| T_{\ell,k}^{\mathcal{H}} \quad (\text{EQ. 8})$$

where $T_\ell^G$ is the lth row of $T^G$ and $T_{\ell,k}^{\mathcal{H}}$ is the (l,k+1) element of $T^{\mathcal{H}}$. Thus, we have that by choosing a family of linearly independent functions $\{w_l\}_{l=1}^M \in W$, we can construct an operator $T^G$, identical for all k, that for every k imposes linear constraints on the elements of $D_k$, which are the parameters defining $\tilde{\mathcal{A}}$. The operator T is constructed by stacking a sequence of M components $\{T_l\}_{l=1}^M$, and similarly $T^G$ is constructed by stacking a sequence of M components $\{T_\ell^G\}_{l=1}^M$. Since each operator $T_l$ is such that the composed map $T_\ell^G = T_l \circ (R \circ \psi_g)$ is linear in our parametrization of $\pi$ by the elements of $D_k$. $T^G$ is also linear in the elements of $D_k$, for every $k=1, \ldots, n$, and hence also $L^g$. Moreover, using (EQ. 8) we have that since $T^G$ is a linear operator from $\tilde{\mathcal{A}}$ to $\mathbb{R}^M$ it admits an M×(n+1) matrix representation, given by $T^G$. Thus, $T^G$ is invertible if and only if $T^G$ is of rank n+1. Therefore, $L^g$ is invertible up to a monotonic amplitude transformation, if and only if $T^g$ is invertible.

Finally, L has the required properties to be a radiometry invariant universal manifold embedding, as it is independent of the specific parameters of $\mathcal{A}$ and U, while its structure is identical for every g.

Remark 1. The proof of Theorem 1 shows by construction that there exists a linear space H which we call the reduced space, and a pair of maps $R: \mathcal{O} \to \mathcal{O}$ and $T: \mathcal{O} \to H$ such that the overall map $T \circ R \circ si_g: \tilde{\mathcal{A}} \times \mathcal{U} \to H$ is invariant to the action of U and is linear in the parameters defining $\tilde{\mathcal{A}}$. This construction holds for every object g∈S, and any monotonic transformation of its amplitudes. The maps T and R are independent of the object. We call the map L=T∘R radiometry invariant universal manifold embedding (RIUME) as it universally maps each of the different manifolds, where each manifold corresponds to a single object, into a different linear subspace of H. The map $\psi_g: \tilde{\mathcal{A}} \times U \to O$ maps $\tilde{\mathcal{A}} \times U$ non-linearly and represents the physical relation between the object and the observations on it. For any fixed pose of an object, the map R projects the entire set of observations related by monotonic amplitude transformations, to a unique point on the canonic manifold which represents the orbit of geometry-only deformations of the object. The map T then maps the result non-linearly so that the composite map $L \circ \psi_g$ $\tilde{\mathcal{A}} \times U \to H$ is such that all observations from $\tilde{S}$ are mapped to the same distinct linear subspace $H_g$ of H.

Denote $\tilde{D} = [e_1 D^T]$ where $e_1 = [1, 0, \ldots, 0]^T$.

Corollary 1. Let $g \in \tilde{S}_g$ and let h be some other function in $\tilde{S}_g$ such that $h = U \circ g \circ \mathcal{A}$, where $\mathcal{A} \in \tilde{\mathcal{A}}$, $U \in \mathcal{U}$. Then rewriting (EQ. 8) in a matrix form we have $$T^{\mathcal{G}}{}_{A^{-1}|\tilde{D}} = T^{\mathcal{H}} \qquad \text{(EQ. 9)}$$

Since $\mathcal{A}$ is invertible, so is its matrix representation b, and hence the column space of $T^{\mathcal{G}}$ and the column space of $T^{\mathcal{H}}$ e are identical subspaces of H. Hence all choices of the representative function of $\tilde{S}_g$ (g, or h, or any other function in the manifold) are equivalent.

Remark 2. Corollary 1 implies that the functions in the manifold $\tilde{S}_g$ form an equivalence class (with respect to producing the linear subspace by the radiometry invariant universal manifold embedding). Hence, any function from the manifold can be chosen as its representative. Any such arbitrary selection would yield the same linear subspace to which the entire manifold is mapped by the radiometry invariant universal manifold embedding.

Radiometry Invariant Universal Manifold Embedding Using High Order Moments

We next extend the results of the previous section where zero- and first-order moments of the result of applying the nonlinear operators $\{w_k\}_{k=1}^{M}$, to the radiometry normalized observations were considered, and employ higher order moments. As we show next, these high order moments yield linear constraints on corresponding higher order moments of the transformation parameters, and hence provide a more detailed linear representation of the linear subspace onto which the manifold is projected. We begin by providing a detailed analysis of the results when second-order moments are employed. The extension to higher orders is immediate, along the same lines.

Let $d_{i,j}$ denote the (i,j) element of D. Thus, using the previously defined notations we have $x_k = \sum_{i=0}^{n} d_{k,i} \tilde{y}_i$. Following a procedure similar to the one in (EQ. 4), linear constraints (up to a scale factor) on the moments of the parametrization of $\mathcal{A}$ found by applying functionals of the forms $\int_{\mathbb{R}^n} x_k x_p w_e(\mathcal{H}(x)) dx$ for some $w_e \in W$. These constraints take the form $$\int_{\mathbb{R}^n} x_k x_p w_\ell(\mathcal{G}(x)) dx = |A^{-1}| \int_{\mathbb{R}^n} \sum_{i=0}^{n} d_{k,i} \tilde{y}_i \sum_{j=0}^{n} d_{p,j} \tilde{y}_j w_\ell(\mathcal{G}(\tilde{y})) d\tilde{y} = \qquad \text{(EQ. 10)}$$

$$|A^{-1}| \sum_{i=0}^{n} \sum_{j=0}^{n} d_{k,i} d_{p,j} \int_{\mathbb{R}^n} \tilde{y}_i \tilde{y}_j w_\ell(\mathcal{G}(\tilde{y})) d\tilde{y}.$$

Thus let $$T^{\mathcal{G},2} = \begin{bmatrix} T^{\mathcal{G},1} & \int_{\mathbb{R}^n} y_1 y_1 w_1(\mathcal{G}(\tilde{y})) d\tilde{y} & \cdots & \int_{\mathbb{R}^n} y_n y_n w_1(\mathcal{G}(\tilde{y})) d\tilde{y} \\ & \vdots & & \vdots \\ & \int_{\mathbb{R}^n} y_1 y_1 w_M(\mathcal{G}(\tilde{y})) d\tilde{y} & \cdots & \int_{\mathbb{R}^n} y_n y_n w_M(\mathcal{G}(\tilde{y})) d\tilde{y} \end{bmatrix}. \qquad \text{(EQ. 11)}$$

Let us denote by $Q^2$ the set of the (inverse) affine transformation parameters and their distinct pairwise products, i.e., $Q^2 = \{d_{1,1}, \ldots, d_{n,n+1}, d_{1,1} d_{1,1}, \ldots, d_{1,1} d_{1,n+1}, \ldots, d_{n,n+1} d_{n,n+1}\}$.

Theorem 2. Let $g \in \tilde{S}_g$ and let $\{1, x_1, \ldots, x_n, x_1 x_1, x_1 x_2, \ldots x_n x_n\}$ be a set of basis functions. Let h be some other function in $\tilde{S}_g$ such that $h = U \circ g \circ \mathcal{A}$, and $\mathcal{A} \in \tilde{\mathcal{A}}$, $U \in \mathcal{U}$. Let M be some positive integer. Then, there exists a linear space $H \supset \mathbb{R}^M$ and a pair of maps $R: O \to O$ and $T^2: O \to H$, such that the restriction of the overall map $L^{g,2} = T^2 \circ R \circ \psi_g: \tilde{\mathcal{A}} \times \mathcal{U} \to H$ to $\tilde{S}_g$, is such that the composed map $L^{g,2}$ is a linear map (up to a fixed scale factor) from $Q^2$ to H. As a linear operator on the parametrization $Q^2$, $T^{\mathcal{G},2}$ admits a matrix representation, $T^{\mathcal{G},2}$ of the form of (EQ. 12), below. The proof follows the same lines as the proof of Theorem 1, and hence is omitted.

Corollary 2. Let g, $h \in \tilde{S}_g$ and $\mathcal{A} \in \tilde{\mathcal{A}}$. Then rewriting (EQ. 10) in a matrix form we have $$T^{\mathcal{G},2}{}_{|A^{-1}|\tilde{D}^2} = T^{\mathcal{H},2} \qquad \text{(EQ. 12)}$$

where the elements of $\tilde{D}^2$ are obtained by rearranging the elements of $Q^2$. Assuming $\tilde{D}^2$ is invertible, the column space of $T^{\mathcal{G},2}$ and the column space of $T^{\mathcal{H},2}$ are identical subspaces of H.

Note that the procedure yielding (EQ. 10) and Theorem 2 can be extended to employ higher order moments by repeating the same methodology. This implies that by increasing the order of the moments from order one in (EQ. 6), to order two in (EQ. 10), and to higher orders, a more detailed characterization of the object manifold is obtained by projecting it onto a linear subspace spanned by the columns of $T^{\mathcal{G},1}$, $T^{\mathcal{G},2}$, $T^{\mathcal{G},K}$ for K-th order moments.

The Distance Between Manifolds

Measuring the distance between two subspaces of a larger subspace is a well explored problem, as described in: page 584 of *Matrix Computations*, 2nd ed., by G. H. Golub and C.F. Van Loan, published by Johns Hopkins Univ. Press. Baltimore, 1989; "On the Largest Principal Angle Between Random Subspaces", by P. A. Absil, A. Edelman and P. Koev, published in *Linear Algebra and its Applications*, pp. 288-294, 2006; "Packing Lines, Planes, etc.: Packings in Grassmannian Spaces", by J. H. Conway, R. H. Hardin and N. J. A. Sloane, published in *Experimental Math.*, pp. 139-159, 1996; and "Bounds on Packing of Spheres in the Grassmann Manifold", by A. Barg and D. Yu. Nogin, published in *IEEE Trans. Info. Theory*, vol. 48, pp. 2450-2454, 2002, the entire contents of each of which is incorporated herein by reference. More formally, this problem is that of measuring the distance on the Grassmann manifold of subspaces of dimension n+1 in an ambient space of dimension M. One way of measuring distance between subspaces is by principal angles. Let $A \in \mathbb{R}^{m \times p}$ and $B \in \mathbb{R}^{m \times q}$ be real matrices with the same number of rows and assume for convenience that A, B have full column rank and that p≥q. We denote the range (column space) of A by range(A).

The q principal angles $$\theta_k \in [0, \frac{\pi}{2}]$$

between range(A) and range(B) are recursively defined for k=1, 2, ..., q as $$\cos(\theta_k) = \max_{\substack{x \in \mathbb{R}^{p(17)} \\ y \in \mathbb{R}^q}} \frac{|x^T A^T B y|}{\|Ax\|_2 \|By\|_2} \quad \text{(EQ. 13)}$$

$$= \frac{|x_k^T A^T B y_k|}{\|Ax_k\|_2 \|By_k\|_2}$$

subject to $x_i^T A^T A x_k = 0$ and $y_i^T B^T B y_k = 0$ for i=1, ..., k−1. Note that all of the principal angles are in the interval $$[0, \frac{\pi}{2}].$$

An alternative method for measuring the distance between subspaces is using the property that projection matrices have one-to-one correspondence to subspaces. That is, given two matrices A, B whose column spaces are the same, the orthogonal projection theorem implies that the projection matrix onto the column space of A is identical to the projection matrix onto the column space of B. This enables us to measure the distance between subspaces by measuring the Frobenius norm of the difference between the projection matrices onto the different object subspaces: Let $P_A$ denote the projection matrix onto the column space of A. $P_B$ is similarly defined. Then, the relation between the Frobenius norm of the difference between the projection matrices onto the two subspaces, and the principal angles between the two subspaces, is given by $$2^{-1/2} \|P_a - P_B\|_F = \|\sin \theta\|_2 \quad \text{(EQ. 14)}$$

Let $P_f$ denote the projection matrix onto the n+1 dimensional column space of $T^f$ defined in (EQ. 7). Assume g and h are two observations on the same object, such that they are related by both an affine geometric transformation, and a monotonic radiometric transformation of their amplitudes, i.e., $h(x) = U(g(\mathcal{A}(x)))$. Using (EQ. 5) we have that $\mathcal{H}(x) = \mathcal{G}(\mathcal{A}(x))$. Applying (10) we have proved the following theorem:

Theorem 3. Let $g \in \tilde{S}_g$ and let h be some other function in $\tilde{S}_g$ such that $h = U \circ g \circ \mathcal{A}$, where $\mathcal{A} \in \tilde{\mathcal{A}}$, $U \in \mathcal{U}$. Then $P_{\mathcal{H}} = P_{\mathcal{G}}$.

Theorem 3 provides the basis for matched manifold detection in the presence of both radiometry and geometry transformations between observations. It is concluded that as long as two observations on the same object differ by an affine transformation of coordinates and some monotonic transformation of the pixel amplitudes, the corresponding projection matrices $P_{\mathcal{H}}$ and $P_{\mathcal{G}}$ will be identical, while projection matrices that result from observations on other objects will be different and hence will yield non-zero distances form $P_{\mathcal{G}}$.

Conclusions

We presented a novel approach for solving the problem of manifold learning, estimation, and detection for the case where the manifold is comprised of the set of all possible observations resulting from the simultaneous action of affine geometric deformations and monotonic radiometric transformations, on some object. Applying to each of the observations the radiometry invariant universal manifold embedding operator, the set of all possible observations on that object is mapped into a single linear subspace-invariant with respect to both the geometric and radiometric transformations. The derivation enables the representation of the object classification and detection problems in a linear subspace matching framework. Since the embedding of the space of observations in the linear space is independent of the specific observed object, it is universal. The derived RIUME provides an exact description of the manifold despite using as low as a single observation, and hence the need for using large amounts of observations in order to learn the manifold or a corresponding dictionary, is eliminated. Moreover, the proposed RIUME does not involve any discretization of the model, nor local approximations of the manifold, as the parametrization of the manifold remains in the continuum.

The invariant representation of the object by the RIUME is the basis of a matched manifold detection and tracking framework of objects that undergo complex geometric and radiometric deformations: The observed surface is tessellated into a set of tiles such that the deformation of each one is well approximated by an affine geometric transformation and a monotonic transformation of the measured intensities. Since each tile is mapped by the radiometry invariant UME to a distinct linear subspace, the detection and tracking problems are solved by evaluating distances between linear subspaces. Classification in this context becomes a problem of determining which labeled subspace in a Grassmannian is closest to a subspace in the same Grassmannian, where the latter has been generated by the RIUME from an unlabeled observation.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to".

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. An image comparison method, the method comprising:
receiving a first image and a second image;
point matching said first image with said second image to identify tentatively corresponding points in said first and second images;
responsive to said identified points, defining a plurality of first image tiles within said received first image;
responsive to said identified points, defining a plurality of second image tiles within said received second image, each of said plurality of second image tiles corresponding to a respective one of said plurality of first image tiles;
for each of said first image tiles and second image tiles, adjusting the intensity of each of a set of pixels responsive to the cumulative relative frequency of the intensity level of said respective pixel within said respective tile;
for each of said intensity adjusted image tiles, applying a plurality of non-linear functions to said respective image tile;
for each of said applied non-linear functions, separately determining a moment of the outcome of said respective non-linear functions for each of a plurality of pixel coordinate axes of said respective image tiles thereby defining a plurality of vectors, each of said plurality of vectors defined by said determined moments for a respective one of said plurality of pixel coordinate axes;
for each of said first image tiles, determining a distance between a subspace which is spanned by said defined vectors of said respective first image tile and a subspace which is spanned by said defined vectors of said corresponding second image tile;
for each of said first image tiles, responsive to said determined distances and a distance rule, determining whether said respective first image tile and its corresponding second image tile comprise observations of the same portion;
outputting an indication of said portions determination;
for each of said first and second image tiles, determining a projection matrix on the subspace spanned by said respective defined vectors,
wherein said distance determination comprises comparing said determined projection matrix on the subspace spanned by said defined vectors of said respective first image tile to said determined projection matrix on the subspace spanned by said defined vectors of said corresponding second image tile.

2. The method of claim 1, further comprising, for each of said first image tiles:
determining a difference between said determined projection matrix on the subspace spanned by said defined vectors of said respective first image tile and said determined projection matrix on the subspace spanned by said defined vectors of said corresponding second image tile; and
determining a Frobenius norm of said determined projection matrix difference, wherein said determined distances are said determined Frobenius norms.

3. The method of claim 1, wherein said first image tiles are defined by determining a Delaunay triangulation on said identified tentatively corresponding points, and
wherein each of said defined plurality of second image tiles is a triangle whose vertices correspond to vertices of said corresponding first image tile.

4. The method of claim 1, wherein said plurality of first image tiles comprises a plurality of sets of first image tiles, said tiles of each of said plurality of sets of first image tiles exhibiting a common geometric constraint different than a respective common geometric constraint of each of said others of said plurality of sets of first image tiles.

5. The method of claim 1, further comprising:
responsive to an object rule, determining whether said portions are of the same object; and
outputting an indication of said object determination.

6. An image comparison system comprising:
a processor; and
a memory, said memory having stored thereon instructions which when run by said processor cause said processor to:
receive a first image and a second image;
point match said first image with said second image to identify tentatively corresponding points in said first and second images;
responsive to said identified points, define a plurality of first image tiles within said received first image;
responsive to said identified points, define a plurality of second image tiles within said received second image, each of said plurality of second image tiles corresponding to a respective one of said plurality of first image tiles;
for each of said first image tiles and second image tiles, adjust the intensity of each of a set of pixels responsive to the cumulative relative frequency of the intensity level of said respective pixel within said respective tile;
for each of said intensity adjusted image tiles, apply a plurality of non-linear functions to said respective image tile;
for each of said applied non-linear functions, separately determine a moment of the outcome of said respective non-linear function for each of a plurality of pixel coordinate axes of said respective image tiles thereby defining a plurality of vectors, each of said plurality of vectors defined by said determined moments for a respective one of said plurality of pixel coordinate axes;
for each of said first image tiles, determine a distance between a subspace which is spanned by said defined vectors of said respective first image tile and a subspace which is spanned by said defined vectors of said corresponding second image tile;
for each of said first image tiles, responsive to said determined distances and a distance rule, determine whether said respective first image tile and its corresponding second image tile comprise observations of the same portion;

output an indication of said portions determination; and for each of said first and second image tiles, cause said processor to determine a projection matrix on the subspace spanned by said respective defined vectors, and wherein said distance determination comprises a comparison of said determined projection matrix on the subspace spanned by said defined vectors of said respective first image tile to said determined projection matrix on the subspace spanned by said defined vectors of said corresponding second image tile.

7. The system of claim 6, wherein said instructions are further arranged, for each of said first image tiles, to cause said processor to:

determine a difference between said determined projection matrix on the subspace spanned by said defined vectors of said respective first image tile and said determined projection matrix on the subspace spanned by said defined vectors of said corresponding second image tile; and determine a Frobenius norm of said determined projection matrix difference, and wherein said determined distances are said determined Frobenius norms.

8. The system of claim 6, wherein said first image tiles are defined by determining a Delaunay triangulation on said identified tentatively corresponding points, and wherein each of said defined plurality of second image tiles is a triangle whose vertices correspond to vertices of said corresponding first image tile.

9. The system of claim 6, wherein said plurality of first image tiles comprises a plurality of sets of first image tiles, said tiles of each of said plurality of sets of first image tiles exhibiting a common geometric constraint different than a respective common geometric constraint of each of said others of said plurality of sets of first image tiles.

10. The system of claim 6, wherein said instructions are further arranged to cause said processor to:

responsive to an object rule, determine whether said portions are of the same object; and output an indication of said object determination.

11. An image comparison system comprising:

a communication module, said communication module arranged to receive a first image and a second image;

a point matching module, said point matching module arranged to point match said first image with said second image to identify tentatively corresponding points in said first and second images;

a tile module, said tile module arranged, responsive to said identified points, to:

define a plurality of first image tiles within said received first image, and define a plurality of second image tiles within said received second image, each of said plurality of second image tiles corresponding to a respective one of said plurality of first image tiles;

an intensity adjustment module, said intensity adjustment module arranged, for each of said first image tiles and second image tiles, to adjust the intensity of each of a set of pixels responsive to the cumulative relative frequency of the intensity level of said respective pixel within said respective tile;

a non-linear function module, said non-linear function module arranged, for each of said intensity adjusted image tiles, to apply a plurality of non-linear functions to said respective image tile;

a moment module, said moment module arranged, for each of said applied non-linear functions, to separately determine a moment of the outcome of said respective non-linear function for each of a plurality of pixel coordinate axes of said respective image tiles thereby defining a plurality of vectors, each of said plurality of vectors defined by said determined moments for a respective one of said plurality of pixel coordinate axes;

a distance module, said distance module arranged, for each of said first image tiles, to determine a distance between a subspace which is spanned by said defined vectors of said respective first image tile and a subspace which is spanned by said defined vectors of said corresponding second image tile;

an object observation module, said object observation module arranged, for each of said first image tiles, responsive to said determined distances and a distance rule, to determine whether said respective first image tile and its corresponding second image tile comprise observations of the same portion;

an output module, said output module arranged to output an indication of said portions determination; and a projection module, said projection module arranged, for each of said first and second image tiles, to determine a projection matrix on the subspace spanned by said respective defined vectors, wherein said distance determination by said distance module comprises a comparison of said determined projection matrix on the subspace spanned by said defined vectors of said respective first image tile to said determined projection matrix on the subspace spanned by said defined vectors of said corresponding second image tile.

12. The system of claim 11, wherein said distance module is further arranged to:

determine a difference between said determined projection matrix on the subspace spanned by said defined vectors of said respective first image tile and said determined projection matrix on the subspace spanned by said defined vectors of said corresponding second image tile; and determine a Frobenius norm of said determined projection matrix difference, and wherein said determined distances are said determined Frobenius norms.

13. The system of claim 11, wherein said plurality of first image tiles are defined by determining a Delaunay triangulation on said identified tentatively corresponding points, and wherein each of said defined plurality of second image tiles is a triangle whose vertices correspond to vertices of said corresponding first image tile.

14. The system of claim 11, wherein said plurality of first image tiles comprises a plurality of sets of first image tiles, said tiles of each of said plurality of sets of first image tiles exhibiting a common geometric constraint different than a respective common geometric constraint of each of said others of said plurality of sets of first image tiles.

15. The system of claim 11, wherein said object observation module is further arranged, responsive to an object rule, to determine whether said portions are of the same object, and wherein said output module is further arranged to output an indication of said object determination.

* * * * *